(12) United States Patent
Woodington et al.

(10) Patent No.: US 12,344,380 B2
(45) Date of Patent: Jul. 1, 2025

(54) AIRCRAFT CABIN

(71) Applicant: Safran Seats GB Limited, Cwmbran (GB)

(72) Inventors: James Woodington, Cwmbran (GB); Paul Wills, Cwmbran (GB); Oscar Ruiz, Cwmbran (GB); Arthur Glain, Cwmbran (GB); Matthew Cleary, Cwmbran (GB); Victor Carlioz, Cwmbran (GB)

(73) Assignee: Safran Seats GB Limited, Cwmbran (GB)

( * ) Notice: Subject to any disclaimer, the term of this patent is extended or adjusted under 35 U.S.C. 154(b) by 563 days.

(21) Appl. No.: 17/280,665

(22) PCT Filed: Sep. 25, 2019

(86) PCT No.: PCT/GB2019/052700
§ 371 (c)(1),
(2) Date: Mar. 26, 2021

(87) PCT Pub. No.: WO2020/065306
PCT Pub. Date: Apr. 2, 2020

(65) Prior Publication Data
US 2021/0380254 A1     Dec. 9, 2021

(30) Foreign Application Priority Data
Sep. 26, 2018 (GB) .................................. 1815697

(51) Int. Cl.
*B64D 11/06* (2006.01)
*B64D 11/00* (2006.01)

(52) U.S. Cl.
CPC ...... *B64D 11/0601* (2014.12); *B64D 11/0015* (2013.01); *B64D 11/0602* (2014.12);
(Continued)

(58) Field of Classification Search
CPC ............ B64D 11/0601; B64D 11/0015; B64D 11/0602; B64D 11/0606; B64D 11/0607; B64D 11/064; B64D 11/0605
See application file for complete search history.

(56) References Cited

U.S. PATENT DOCUMENTS 1,998,186 A * 4/1935 Caesar ................. B60N 2/3043
297/116
5,024,398 A * 6/1991 Riedinger .......... B64D 11/0605
244/118.5
(Continued)

FOREIGN PATENT DOCUMENTS

CN 107949520 A 4/2018
EP 0850834 A1 7/1998
(Continued)

OTHER PUBLICATIONS

Europe Patent Application No. 19780299.4, Office Action (Communication pursuant to Article 94(3) EPC), dated Sep. 6, 2022.
(Continued)

*Primary Examiner* — Joshua J Michener
*Assistant Examiner* — Cindi M Curry
(74) *Attorney, Agent, or Firm* — Kilpatrick Townsend & Stockton LLP

(57) ABSTRACT

An aircraft cabin is provided. The aircraft cabin comprises a first seat unit and a second seat unit, the first and second seat units being in a first row of seat units and being separated by an aisle. The cabin comprises a partition movable between a stowed position and a deployed position in which the partition is positioned at least partially in the aisle between the first and second seat units thereby at least partially blocking the aisle. The cabin further comprises an item of furniture movable between a stowed position and a
(Continued)

deployed position in which the item of furniture is positioned in the aisle between the first and second seat units.

14 Claims, 6 Drawing Sheets

(52) U.S. Cl.
CPC ...... *B64D 11/0606* (2014.12); *B64D 11/0607* (2014.12); *B64D 11/064* (2014.12)

(56) References Cited

U.S. PATENT DOCUMENTS

| | | | | |
|---|---|---|---|---|
| 7,354,018 | B2* | 4/2008 | Saint-Jalmes | B64D 11/00 244/118.6 |
| 8,820,682 | B2* | 9/2014 | Orson | B64D 11/00 244/119 |
| 11,679,881 | B2* | 6/2023 | White | B64D 11/0605 244/118.6 |
| 2005/0001097 | A1* | 1/2005 | Saint-Jalmes | B64D 11/00 244/118.6 |
| 2007/0170310 | A1* | 7/2007 | Bock | B64D 11/0604 244/118.5 |
| 2009/0050740 | A1 | 2/2009 | Saint-Jalmes et al. | |
| 2010/0187357 | A1* | 7/2010 | Funke | B60N 3/001 244/118.6 |
| 2012/0318918 | A1 | 12/2012 | Johnson et al. | |
| 2013/0248653 | A1 | 9/2013 | Round et al. | |
| 2013/0256456 | A1* | 10/2013 | Malek | B64D 11/0638 244/118.6 |
| 2014/0300152 | A1* | 10/2014 | Park | B64D 11/0641 297/232 |
| 2017/0240283 | A1 | 8/2017 | Dowty | |
| 2018/0281964 | A1 | 10/2018 | Carlioz et al. | |
| 2019/0233114 | A1* | 8/2019 | Fullerton | B64D 11/0023 |
| 2019/0315468 | A1* | 10/2019 | White | B64D 11/0605 |
| 2021/0188441 | A1* | 6/2021 | Lee | B64D 11/0604 |
| 2021/0261255 | A1* | 8/2021 | Dowty | B64D 11/0601 |
| 2021/0347483 | A1* | 11/2021 | Woodington | B64D 11/0602 |
| 2021/0380254 | A1* | 12/2021 | Woodington | B64D 11/0602 |

FOREIGN PATENT DOCUMENTS

| | | |
|---|---|---|
| FR | 3059951 A1 | 6/2018 |
| WO | 2016164352 A1 | 10/2016 |
| WO | 2016164524 A1 | 10/2016 |
| WO | 2018033599 A1 | 2/2018 |

OTHER PUBLICATIONS

International Patent Application No. PCT/GB2019/052700, International Search Report and Written Opinion, dated Dec. 5, 2019.
United Kingdom Patent Application No. GB1815697.6, Search Report, dated Mar. 13, 2019.
China Patent Application 201980063046.9, Office Action, dated Apr. 14, 2023.
China Patent Application 201980063046.9, Search Report, dated Apr. 10, 2023.

* cited by examiner

AIRCRAFT CABIN

CROSS-REFERENCE TO RELATED APPLICATIONS

This application claims the benefit of United Kingdom Patent Application No. 1815697.6, filed on Sep. 26, 2018.

FIELD OF THE INVENTION

The present invention concerns an aircraft cabin. More particularly, but not exclusively, this invention concerns an aircraft cabin comprising a first seat unit and a second seat unit, the first and second seat units being in a first row of seat units and being separated by an aisle.

BACKGROUND OF THE INVENTION

Airlines are increasingly providing aircraft cabins which incorporate facilities for companion travel into first-class or business-class suites. For example, the "Skyroom" provided by Zodiac Seats UK for Singapore Airlines uses two first class seat units within a column of seat units to create a shared space for companion travel. Furthermore, there are business class seating arrangements which can be configured with shared space for companion travellers using the middle seats of a 1-2-1 configuration, e.g. the "Skylounge" provided by Zodiac Seats France for Emirates. Qatar Airways' "QSuites"® also allows for companion travel in the middle columns of a 1-2-1 configuration for two travellers and can also be extended for interaction of up to four travellers in two adjacent rows. The "Optima" seats by Zodiac Seats UK are another example of a seating arrangement in which the middle two seats of a 2-4-2 configuration can be converted into a shared space for companion travellers, this arrangement also provides the option of creating a double bed.

There is a desire to provide companion travellers with more shared space. However, space within an aircraft cabin is relatively limited and it is difficult to provide shared space that is usable by companion travellers wishing to enjoy privacy from other travellers during flight.

The present invention seeks to mitigate the above-mentioned problems.

SUMMARY OF THE INVENTION

The present invention provides, according to a first aspect, an aircraft cabin comprising a first seat unit and a second seat unit, the first and second seat units being in a first row of seat units and being separated from each other by an aisle, wherein the cabin comprises a partition movable between a stowed position and a deployed position in which the partition is positioned at least partially in the aisle between the first and second seat units thereby at least partially blocking the aisle, and wherein the cabin further comprises an item of furniture movable between a stowed position and a deployed position in which the item of furniture is positioned in the aisle between the first and second seat units.

By providing the first and second seat units with a partition that is deployable to a position in which the partition at least partially blocks the aisle, it is possible to convert the aisle space between the first and second seat units into a private space that is shared between the first and second seat units. Furthermore, an item of furniture can be deployed into the shared space in the aisle so that the item of furniture can be shared between passengers in the first and second seat units. For example, when an aircraft comprising the cabin is being boarded, the partition and item of furniture can be stowed away such the aisle is unblocked and passengers and crew can pass through the aisle space between the first and second seat units to reach other parts of the aircraft cabin, for example. In its stowed position, the partition does not block the aisle. In its stowed position, the item of furniture is positioned out of the aisle. The partition and item of furniture may remain stowed during taxi, take-off and landing. During flight, when it is not necessary for passengers and crew to access the aisle space between the first and second seat units, the partition and item of furniture can be moved to their deployed positions, thereby creating a private space that is shared between passengers of the first and second seat units.

Each seat unit may comprise one or more seats. Each seat unit may comprise exactly one seat that is convertible to a bed. In embodiments of the invention comprising more than one partition, the partition may be referred to as a first partition. There may be one, two, three, or four partitions. The partition may remain stowed during taxi, take-off and landing. In its stowed position, the partition does not block the aisle. The item of furniture may remain stowed during taxi, take-off and landing. In its stowed position, the item of furniture is positioned out of the aisle. In embodiments of the invention comprising more than one aisle, the aisle may be referred to as a first aisle.

In the deployed position, the partition may block the aisle between the first and second seat units such that a person cannot pass through the aisle space between the first and second seat units without moving the partition from the deployed position. In the deployed position, the partition may fully block the aisle.

The cabin may further comprise a floor, the first seat unit may comprise a first seat, and the second seat unit may comprise a second seat, wherein at least one of the first and second seats is rotatably mounted upon the cabin floor. At least one of the first and second seats may be rotatable to face the aisle. Both of the first and second seats may be rotatably mounted upon the cabin floor and rotatable to face across the aisle to the other seat.

The first and/or second seats may be rotatable by at least 50 degrees, preferably by at least 70 or 90 degrees. The first and/or second seats may be rotatable by at least 140 degrees, and preferably by at least 160 degrees, or more preferably, by 180 degrees. The first and/or second seats may be rotatable to face away from the aisle and preferably face away from the other seat. The aircraft cabin may have a longitudinal axis. The aisle may run substantially parallel to the longitudinal axis. The first row may run substantially perpendicular to the longitudinal axis and/or aisle. The first and/or second seat may be rotatable between a position in which the first and/or second seat faces a direction substantially parallel to the longitudinal axis and a direction in which the first and/or second seat faces substantially perpendicular to the longitudinal axis.

The aisle may comprise a floor and the item of furniture, in its deployed position, may be mounted to the floor or one of the first and second seat units.

In the deployed position, the item of furniture may block the aisle between the first and second seat units such that a person cannot pass through the aisle space between the first and second seat units without first moving the item of furniture from the deployed position.

At least one of the aisle floor, first seat unit, and second seat unit may be provided with a mounting attachment for mounting the item of furniture.

The item of furniture may be a display monitor, such as an In-Flight-Entertainment (IFE) screen, a screen connectable to a personal electronic device (PED) or a computer games' console screen. The item of furniture may be a piece of exercise equipment. The item of furniture may be a further seat. Advantageously, the item of furniture may be a table. The first and second seat units may therefore be provided with a table which both of the passengers of the first and second seat units may share and use together. In a preferred arrangement in which both of the first and second seats are rotatable to face across the aisle to the other seat, the table may be positioned between the first and second seat units such that the first and second seats are rotatable so that passengers of the first and second seats can use the table to, for example, dine or work together while facing one another.

One of the first and second seat units may comprise a seat that is at least partially enclosed by one or more privacy walls. The privacy walls may be at least 1090 millimetres (43 inches) high as measured from the cabin floor. Preferably, the privacy walls may be at least 1270 millimetres (50 inches) high, even more preferably at least 1520 millimetres (60 inches) high as measured from the cabin floor.

In the deployed position, the partition may be positioned adjacent a privacy wall. In the deployed position, the partition may be positioned substantially parallel to a privacy wall and, preferably act as an extension of the privacy wall into the aisle.

The aircraft cabin may comprise a second partition movable between a stowed position and a deployed position in which the second partition is positioned at least partially in the aisle between the first and second seats units thereby at least partially blocking the aisle, and wherein, in the deployed position, the first partition is positioned adjacent a first privacy wall and the second partition is positioned adjacent a second privacy wall, the first and second privacy walls being located adjacent different regions of the aisle.

For example, the first privacy wall may be adjacent a region toward a front of the seat units (towards the front of the cabin). The second privacy wall may be located adjacent a region towards a rear of the seat units (towards the rear of the cabin). The privacy walls may therefore be located at different positions along the longitudinal axis of the cabin.

The aircraft cabin may comprise a third seat unit in the first row of seat units. The third seat unit may be positioned adjacent one of the first or second seat units, the third seat unit being separated from the one of the first or second seat unit by a privacy screen. The privacy screen may be at least 1090 millimetres (43 inches) high as measured from the cabin floor. Preferably, the privacy screen may be at least 1270 millimetres (50 inches) high, even more preferably at least 1520 millimetres (60 inches) high as measured from the cabin floor. The privacy screen may be moveable between a stowed position and a deployed position. The privacy screen may be moveable to the stowed position by being lowered from the deployed position. Moving the privacy screen to the stowed position may provide a shared space between the third seat unit and the one of the first or second seat units.

The aircraft cabin may further comprise a fourth seat unit in the first row of seat units, the third and fourth seat units being separated from each other by a second aisle. The cabin may comprise a further partition movable between a stowed position and a deployed position in which the further partition is positioned at least partially in the second aisle between the third and fourth seat units thereby at least partially blocking the second aisle. The cabin may further comprise a further item of furniture movable between a stowed position and a deployed position in which the further item of furniture is positioned in the aisle between the third and fourth seat units.

The third seat unit may be separated from one of the first or second seat units by a second aisle. The cabin may further comprise a further partition movable between a stowed position and a deployed position in which the further partition is positioned at least partially in the second aisle between the second and third seat units thereby at least partially blocking the second aisle. The cabin may further comprise a further item of furniture movable between a stowed position and a deployed position in which the further item of furniture is positioned in the aisle between the second and third seat units.

The first row of seat units may be the only row of seat units in the cabin provided with a moveable partition and a moveable item of furniture. For reasons of passenger safety in an emergency, certification reasons, or, for example, reasons relating to passenger and/or crew access to cabin facilities, it may be necessary to have only one row of seats units configured so that aisle space between the seat units is convertible into a shared private space. The first row of seats may be a front or rear row of seats of the cabin.

According to a second aspect of the invention, there is provided an aircraft cabin comprising a first seat unit and a second seat unit, the first and second seat units being in a first row of seat units and being separated from each other by an aisle, and a first further seat unit and a second further seat unit, the first further seat unit and second further seat unit being in a second row of seat units, the second row of seat units being positioned adjacent the first row of seat units, the first further seat unit and second further seat unit being separated from each other by the aisle, wherein each of the first seat unit, second seat unit, first further seat unit, and second further seat unit comprises a seat and a privacy wall positioned between the seat and the aisle, the privacy wall being movable between a stowed position and a deployed position in which the seat is at least partially enclosed by the privacy wall, and wherein the cabin comprises a partition movable between a stowed position and a deployed position in which the partition is positioned at least partially in the aisle between the first and second seat units thereby at least partially blocking the aisle.

Such an arrangement would therefore convert the aisle space between four seat units into a private space that is shared between companion passengers of those seat units. There may be additional substantially identically configured rows of seat units so that the size of the shared space can be increased on a row-by-row basis therefore enabling a shared space to be created between six, eight, and so on, seat units positioned either side of the aisle.

The cabin may comprise one, two, or multiple items of furniture movable between a stowed position and a deployed position in which the item of furniture is positioned in the aisle between the first and second seat units and/or between the first further seat unit and second further seat unit. The cabin may comprise an additional partition movable between a stowed position and a deployed position in which the additional partition is positioned at least partially in the aisle between the first further seat unit and the second further seat unit thereby at least partially blocking the aisle.

According to a third aspect, the present invention provides a kit of parts for installation in an aircraft to provide the aircraft cabin of the first aspect of the invention, the kit of part comprising a plurality of seat units, a partition, and an item of furniture.

According to a fourth aspect, the present invention provides an aircraft comprising the aircraft cabin of the first aspect of the invention.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which.

DETAILED DESCRIPTION

Figure 1:
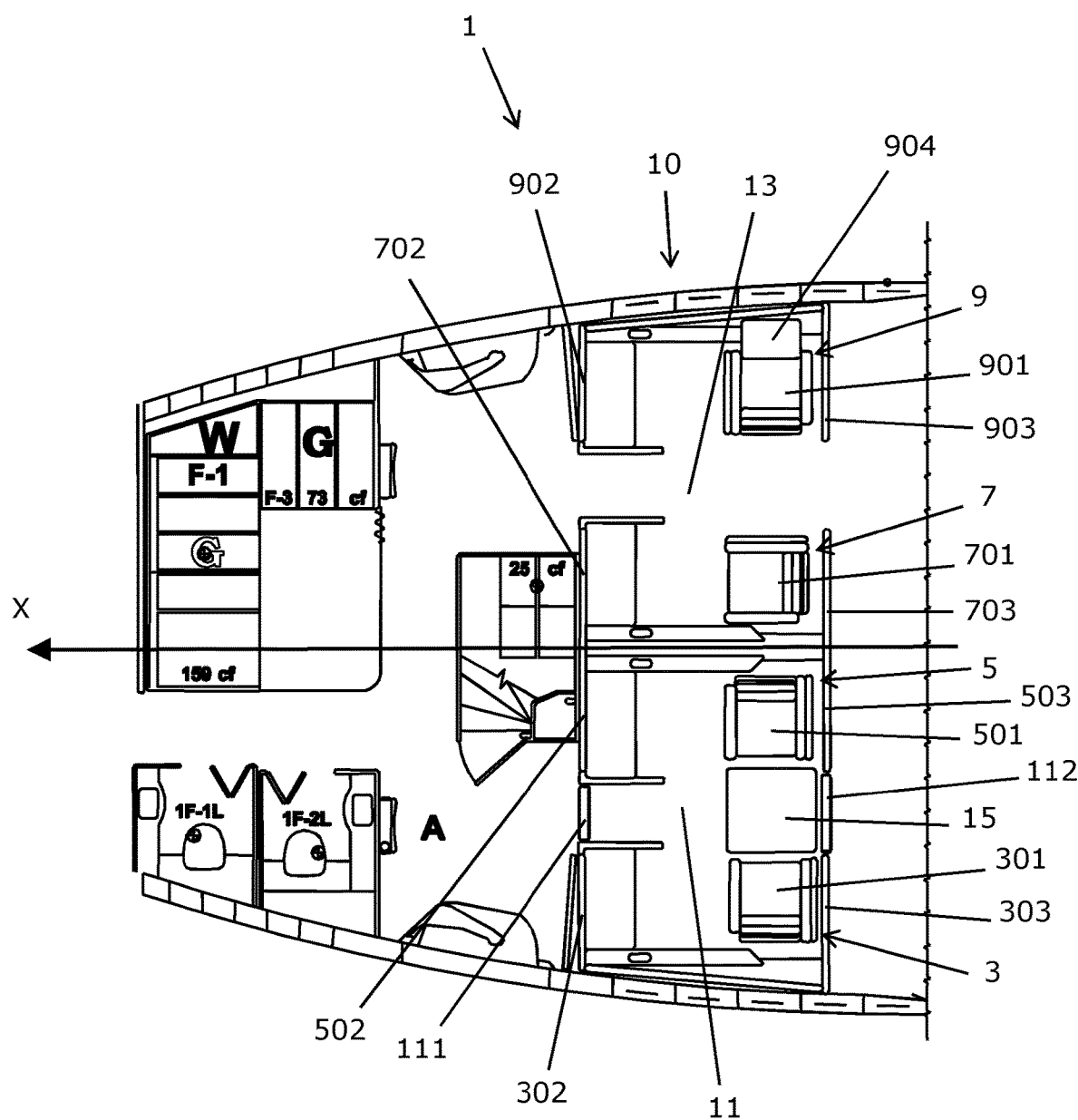
FIG. 1 is a plan view of an aircraft cabin according to a first embodiment of the invention.

A plan view of an aircraft cabin 1 according to a first embodiment of the invention is shown FIG. 1. The cabin 1 comprises four seat units 3, 5, 7, 9 arranged in a first row 10. A first seat unit 3 and a second seat unit 5 are separated by a first aisle 11 and a third seat unit 7 and a fourth seat unit 9 are separated by a second aisle 13. The first seat unit 3 and fourth seat unit 9 are positioned at the port and starboard sides of the aircraft, respectively, and the second seat unit 5 and third seat unit 7 are positioned adjacent one another between the first and second aisles 11, 13.

Each seat unit 3, 5, 7, 9 comprises a seat 301, 501, 701, 901. Each of the seats 301, 501, 701, 901 is rotatably mounted upon the cabin floor and rotatable by 180 degrees between a position in which the seat 301, 501, 701, 901 faces into the aisle and a position in which the seat 301, 501, 701, 901 faces away from the aisle 10. During taxi, take-off, and landing the seats 301, 501, 701, 901 face in a direction parallel with the longitudinal axis X (the third seat 701 is shown in this position in FIG. 1). In certain embodiments, and as illustrated in FIG. 1, seat units include seats positioned at a same position along the longitudinal axis X. For example, FIG. 1 illustrates seats 301, 501, 701, 901 at a first position along the longitudinal axis X.

A front privacy wall 302, 502, 702, 902 is located in front of each seat 301, 501, 701, 901 and a rear privacy wall 303, 503, 703, 903 is located behind each seat, the front privacy walls 302, 502, 702, 902 and rear privacy walls 303, 503, 703, 903 extend to a height of 1520 millimetres (60 inches), as measured from the cabin floor, thereby enclosing the seats 301, 501, 701, 901 from the front and the rear, in relation to the longitudinal axis X.

During boarding of the aircraft, for example, access through the first aisle 11 and second aisle 13 is needed for the aircraft crew and passengers (in FIG. 1, the second aisle 13 allows such access). However, when such access is not needed, for example during flight, it is possible to block one or both aisles 11, 13 to convert the aisles 11, 13 into a space which is shared between the seat units 3, 5, 7, 9 either side of the aisles 11, 13. In FIG. 1, first aisle 11 provides such a shared space (in FIG. 1, the first aisle 11 is shown in this configuration).

The cabin also comprises tables 15 that are deployable to between the first and second seats 301, 501 and/or the third and fourth seats 701, 901 to provide furniture that is shareable between the passengers sitting in those seats. A table 15 is shown in its deployed position between the first and second seats 301, 501 in FIG. 1 and FIG. 2. In order to deploy the table 15, the table 15 is mounted to a mounting attachment located in the cabin floor (not shown).

Figure 2:
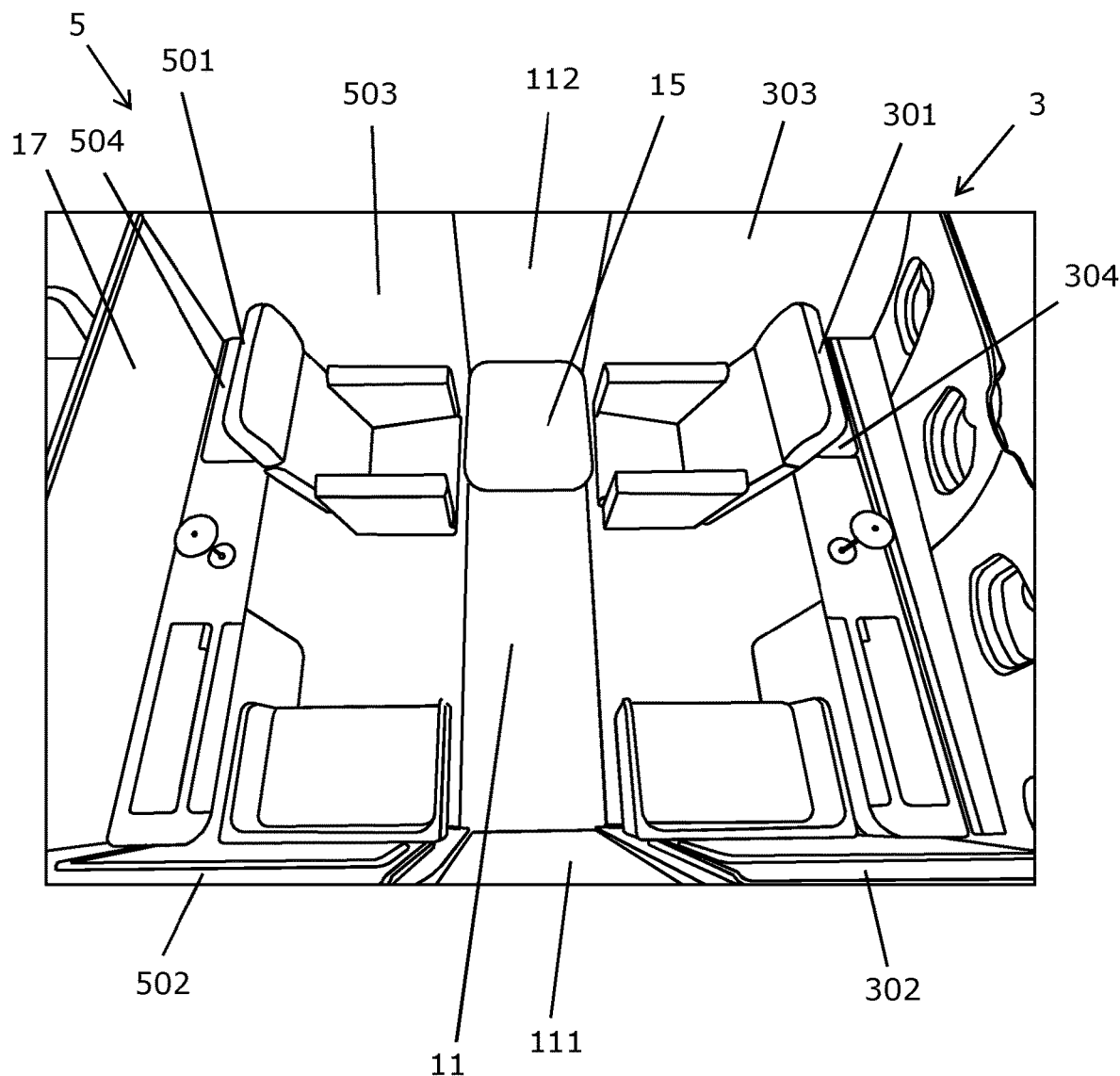
FIG. 2 is an overhead view of the first and second seat units of the aircraft cabin of FIG. 1 arranged with a shared table.
Figure 3:
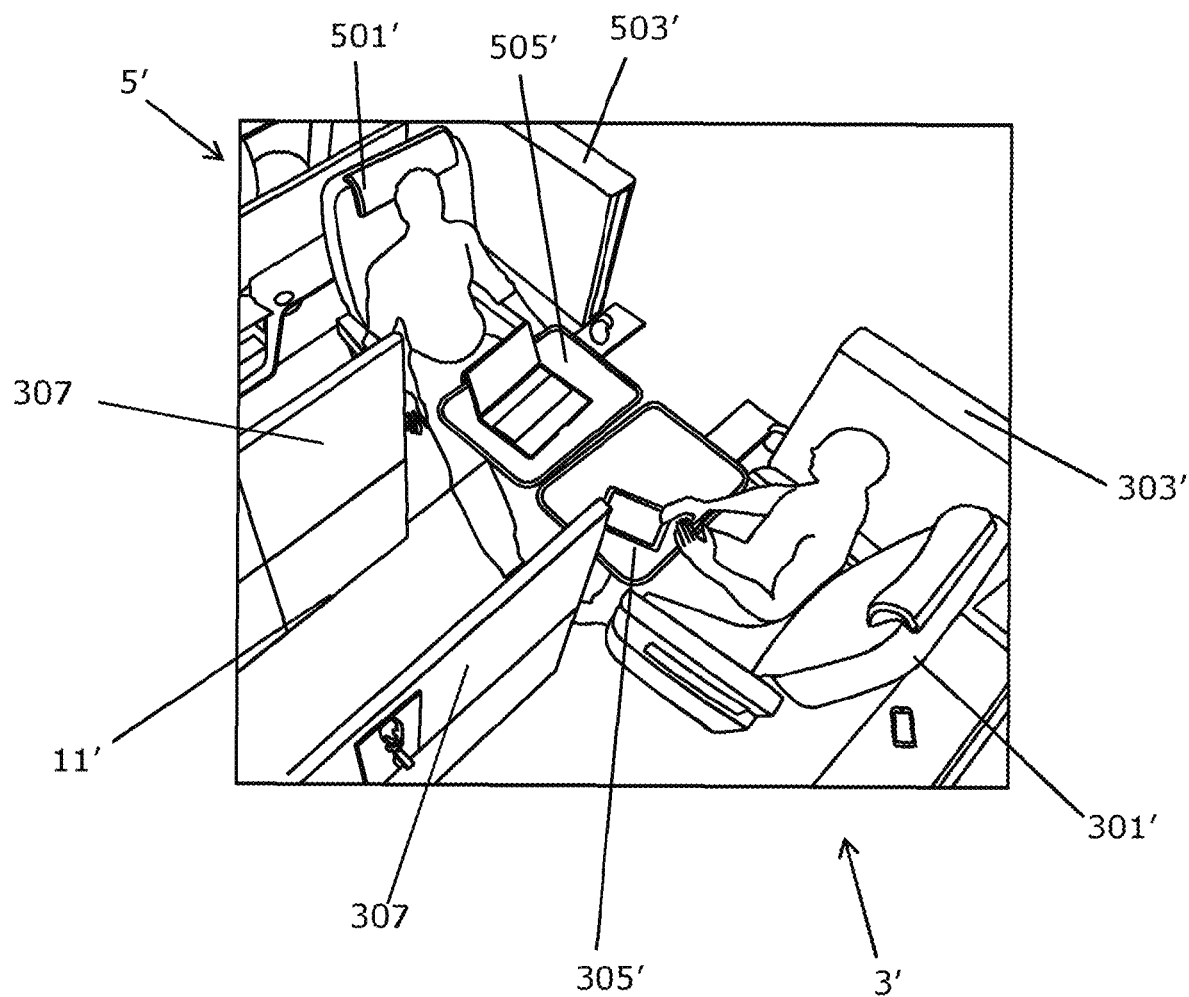
FIG. 3 is an overhead view of first and second seat units belonging to an aircraft cabin comprising an alternative shared table arrangement to that shown in FIG. 2.

FIG. 3 shows an alternative arrangement where first and second seat units 3', 5' comprise first and second seats 301', 501'. The first and second seat units 3', 5' each include an aisle-side privacy wall 307. The first and second seats 301', 501' comprise deployable tray tables 305', 505' mounted upon the rear privacy wall 303', 503', of the respective seat units 3', 5'. As can be seen in FIG. 3, when the first and second seats 301', 501' are rotated such that they face one another across the first aisle 11', the tray tables 305', 505' can be deployed and together form a shared table that can be used, for example, for face-to-face dining. In an aircraft cabin comprising an arrangement as shown in FIG. 3 therefore, there may be no need for the deployable table 15 arrangement shown in FIG. 2.

As can be seen in both FIG. 1 and FIG. 2, a front partition 111 is moveable to a deployed position in which it is positioned adjacent and in between the front privacy walls 302, 502 of the first and second seat units 3, 5 to fully block the first aisle 11 from a front direction. FIG. 1 and FIG. 2 also show that a rear partition 112 is moveable to a deployed position in which it is positioned adjacent and in between the rear privacy walls 303, 503 of the first and second seat units 3, 5 to fully block the first aisle 11 from a rear direction. The partitions 111, 112 are configured to slide into place to block the first aisle 11. Deploying both the front and rear partitions 111, 112 creates a substantially enclosed private space that is shared between passengers sat in the seats 301, 501 of the first and second seat units 3, 5. Further front and rear partitions are deployable to block the second aisle 13 in a similar manner, to form an enclosed private space that is shared between passengers sat in the seats 701, 901 of the third and fourth seat units 7, 9.

As can be seen, because the seats 301, 501, 701, 901 are rotatably mounted it is possible for the passengers sat in the first and second seats 301, 501 to rotate their seats 301, 501 to face one another and share the table 15 to, for example, dine or work together. Should the passengers not want to share the table 15, the seats 301, 501 can be rotated to a position which faces away from the first aisle 11 so that secondary tables 304, 504 positioned at the sides of the seat units 3, 5 opposite the first aisle 11 can be used separately. In FIG. 1 the seat 901 belonging to the fourth seat unit 9 is shown as facing away from the second aisle 13 so that a secondary table 904 can be used.

Figure 4:
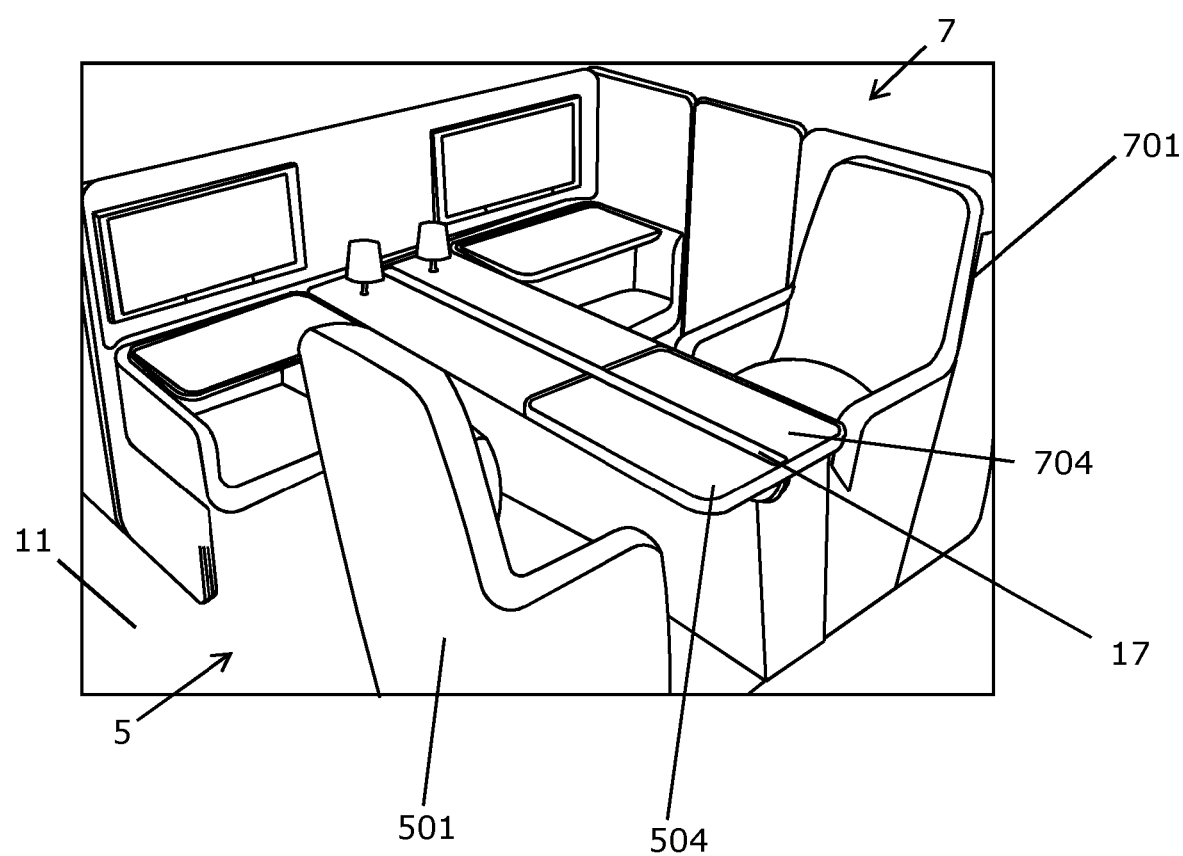
FIG. 4 is a perspective view of the second and third seat units of the aircraft cabin of FIG. 1.

The adjacent second and third seat units 5, 7 are separated by a privacy screen 17 that is shown in FIG. 2 in its deployed position. The privacy screen 17 is stowable should the passengers located in the second and third seat units 5, 7 wish to create a shared space during flight. The privacy screen 17 is shown in its stowed position in FIG. 4. There, the screen 17 has been lowered to be underneath secondary tables 504, 704 so that a top edge of the screen 17 is flush with the tables 504, 704. As can be seen, the second and third seats 501, 701 are able to rotate away from the aisles 11, 13 to face one another so that the passengers sitting in the second and third seats 501, 701 can, for example, dine or work together at a shared table that is formed by the secondary tables 504, 704 belonging to each seat unit 5, 7.

Figure 5:
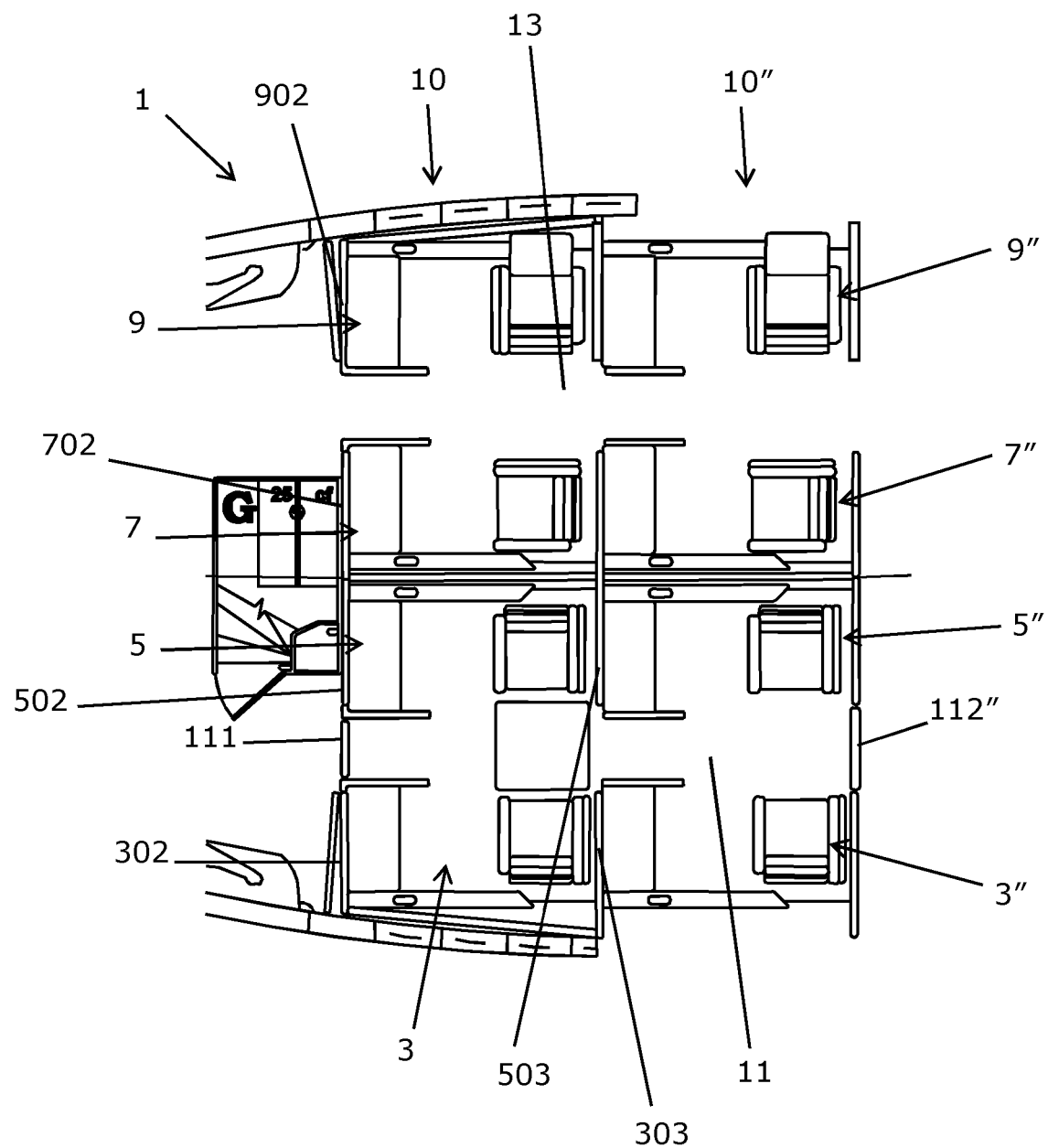
FIG. 5 is a plan view of an aircraft cabin according to an embodiment of the invention that comprises a first and second row of seat units.

As can be seen from FIG. 5, the aircraft cabin may comprise a fifth seat unit 3" and a sixth seat unit 5" in a second row 10" of seat units, positioned behind the first row 10 of seat units, the fifth and sixth seat units 3", 5" also being separated by the first aisle 11. The first and second row 10, 10" of seat units share privacy walls such that the rear privacy walls 303, 503 belonging to the first and second seat units 3, 5 also provide the front privacy walls 303, 503 belonging to the fifth and sixth seat units 3", 5" respectively. The fifth and sixth seat units 3", 5" comprise a rear partition 112", which is shown in its deployed position in FIG. 5, substantially identical to the rear partition 112 that belongs to the first and second seat units 3, 5. It is therefore possible to deploy the front partition 111 belonging to the first and second seat units 3, 5 and the rear partition 112" belonging to the fifth and sixth seat units 3", 5" in order to convert the first aisle 11 between the first, second, fifth, and sixth seat units 3, 5, 3", 5" into a space that is shared between the first, second, fifth and sixth seat units 3, 5, 3", 5" such that four companion travellers located in those seat units can share the space between the seat units. Furthermore, the second row may also comprise a seventh and eighth seat unit, 7", 9" which are positioned either side of the second aisle 13, behind the third and fourth seat units 7, 9 respectively as shown in FIG. 5. Front and rear partitions (not shown) may be deployable in substantially the same way as described above in relation to the front and rear partitions 111, 112" to create a shared space between the third, fourth, seventh, and eighth seat units 7, 9, 7", 9".

Figure 6:
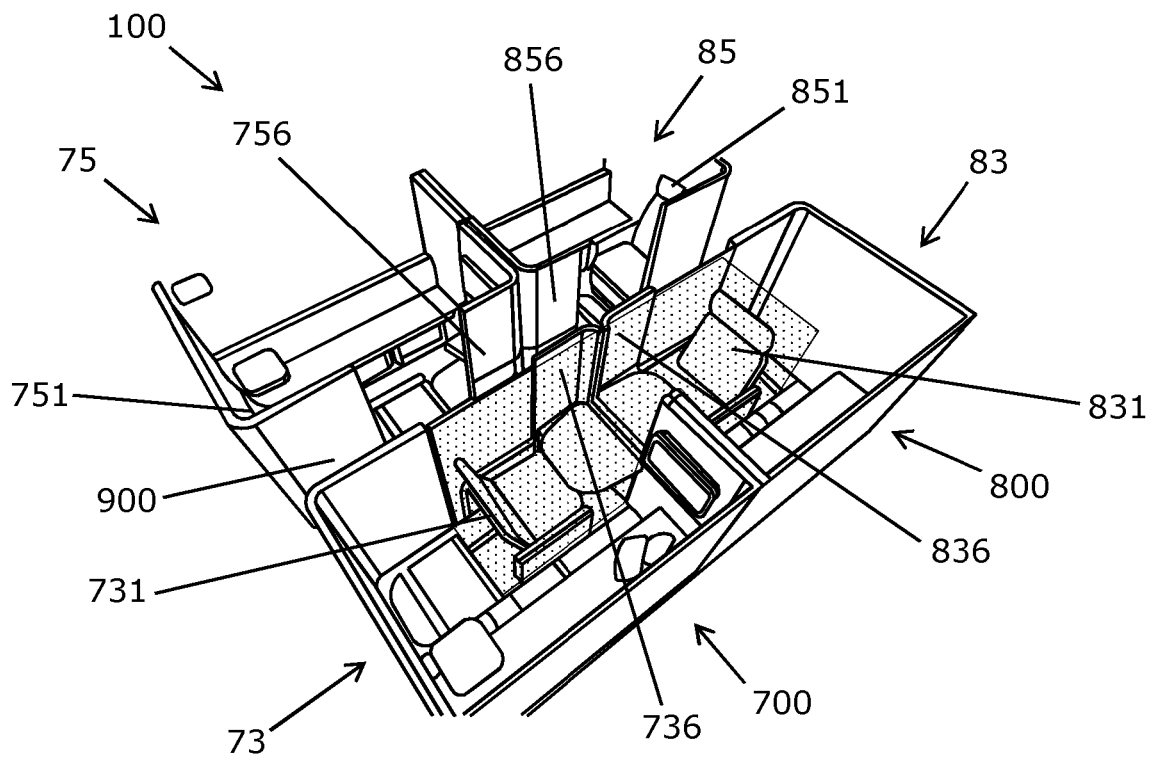
FIG. 6 is an overhead view of an aircraft cabin according to a second embodiment of the invention shown with seat unit privacy walls in a deployed position.
Figure 7:
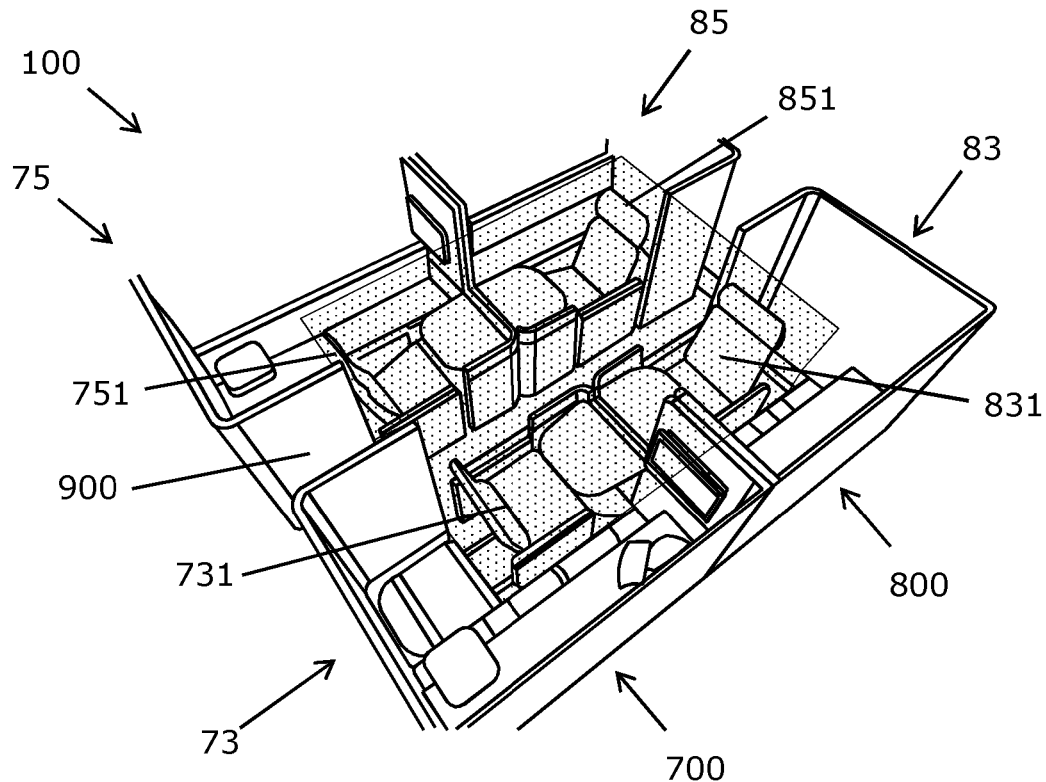
FIG. 7 corresponds to the view shown in FIG. 6 but with the seat unit privacy walls in the stowed position.

A section of an aircraft cabin 100 according to another embodiment of the invention is shown in FIGS. 6 and 7. The aircraft cabin 100 comprises a first seat unit 73 and a second seat unit 75 separated by an aisle 900 in a first row 700 of seat units, and comprises a third seat unit 83 and a fourth seat unit 85 separated by the aisle 900 in a second row 800 of seat units, wherein each seat unit 73, 75, 83, 85 comprises a seat 731, 751, 831, 851. Each of the seats comprises a privacy wall 736, 756, 836, 856 positioned between its seat 731, 751, 831, 851 and the aisle 900, thereby enclosing the seat 731, 751, 831, 851 and acting as a barrier between the seat 731, 751, 831, 851 and the aisle 900. Each of the privacy walls 736, 756, 836, 856 is shown in a deployed position in FIG. 6 in which the seats 731, 751, 831, 851 are enclosed by the privacy walls 736, 756, 836, 856. However, the privacy walls 736, 756, 836, 856 are movable to a stowed position, as shown in FIG. 7, in which the privacy walls 736, 756, 836, 856 are lowerable to a position in which they no longer enclose the seats 731, 751, 831, 851, thereby removing the barrier between the seats 731, 751, 831, 851 and the aisle 900. As can be seen FIG. 7, when the privacy walls 736, 756, 836, 856 are lowered, a shared space can be created in the aisle 900 between the first, second, third, and fourth seat units 73, 75, 83, 85. Furthermore, partitions (not shown) are moveable to deployed positions within the aisle 900, in substantially the same way as described with respect to the first embodiment of the invention, so that a substantially enclosed private space that is shared between passengers sat in the seats 731, 751, 831, 851 of the first second, third and fourth seat units 73, 75, 83, 85. Furthermore, tables (not shown) are also moveable to deployed positions within the aisle 900, in substantially the same way as described with respect to the first embodiment of the invention.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

In certain embodiments of the invention the partitions may be hinged, or alternatively, may be completely detachable and stowed within, for example, a compartment somewhere within the aircraft cabin. Alternatively, the partitions could be curtains.

The aircraft cabin may comprise only three seat units arranged in the first row (and second row, if present). A first seat unit and a second seat unit are separated by a first aisle, as before, and the second seat unit and a third seat unit are separated by a second aisle. Partitions are deployable between the first and second seat units to provide a shared spaced between the first and second seat units. Partitions are also deployable between the second and third seat units to provide a shared space between the second and third seat units.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft cabin comprising:
a first seat unit comprising a first front privacy wall, a first rear privacy wall, and a first seat between the first front privacy wall and the first rear privacy wall;
a second seat unit comprising a second front privacy wall, a second rear privacy wall, and a second seat between the second front privacy wall and the second rear privacy wall;
an aisle
extending substantially parallel to a longitudinal axis of the aircraft cabin and between the first seat unit and the second seat unit such that the first seat unit are on opposing lateral sides of the aisle, wherein:
the second front privacy wall is laterally aligned with the first front privacy wall;
the second rear privacy wall is laterally aligned with the first rear privacy wall; and
the first and second seats are rotatably mounted to a floor of the aircraft cabin and are rotatable to face each other across the aisle;
a partition movable between a stowed position and a deployed position, wherein, in the deployed position, the partition is positioned at least partially in the aisle and either (i) between the first front privacy wall and the second front privacy wall or (ii) between the first rear privacy wall and the second rear privacy wall, such that the partition at least partially blocking the aisle; and a table mounted to at least one of the first rear privacy wall or the second rear privacy wall, wherein the table is movable between a stowed position and a deployed position, wherein:

in the deployed position the table is positioned in the aisle (i) laterally at a location between the first and second seats and (ii) longitudinally at a location between the first front privacy wall and the first rear privacy wall, such that, when the first and second seats are rotated to face each other, respective passengers seated in the respective first and second seats can both use the table while facing one another, and in the stowed position the table is positioned out of the aisle such that passengers can pass through the aisle, from the respective first and second front privacy walls to the respective first and second rear privacy walls without being obstructed by the table.

2. The aircraft cabin according to claim 1, wherein, in the deployed position, the partition blocks the aisle between the first and second seat units such that a person cannot pass through the aisle between the first and second seat units without moving the partition from the deployed position.

3. The aircraft cabin according to claim 1, wherein the partition is a first partition, wherein the aircraft cabin comprises a second partition movable between a stowed position and a deployed position in which the second partition is positioned at least partially in the aisle between the first and second seat units thereby at least partially blocking the aisle, and wherein, in the deployed position, the first partition is positioned adjacent the first and second front privacy walls and the second partition is positioned adjacent the first and second rear privacy walls.

4. The aircraft cabin according to claim 1, comprising a third seat unit positioned adjacent one of the first or second seat units, the third seat unit being separated from the one of the first or second seat unit by a privacy screen.

5. The aircraft cabin according to claim 4, wherein the aircraft cabin further comprises a fourth seat unit, the third and fourth seat units being separated from each other by a second aisle, wherein the cabin comprises an additional partition movable between a stowed position and a deployed position in which the additional partition is positioned at least partially in the second aisle between the third and fourth seat units thereby at least partially blocking the second aisle, and wherein the cabin further comprises an additional item of furniture movable between a stowed position and a deployed position in which the additional item of furniture is positioned in the aisle between the third and fourth seat units.

6. The aircraft cabin according to claim 1, wherein the aircraft cabin further comprises a third seat unit laterally aligned with the first seat unit and the second seat unit, the third seat unit being separated from one of the first or second seat units by a second aisle, wherein the cabin comprises an additional partition movable between a stowed position and a deployed position in which the additional partition is positioned at least partially in the second aisle between the second and third seat units thereby at least partially blocking the second aisle, and wherein the cabin further comprises an additional item of furniture movable between a stowed position and a deployed position in which the additional item of furniture is positioned in the aisle between the second and third seat units.

7. The aircraft cabin according to claim 1, wherein a row of seat units defined by the first seat unit and the second seat unit is the only row of seat units in the cabin provided with the partition.

8. The aircraft cabin according to claim 1, comprising a third seat unit and a fourth seat unit, the third seat unit and fourth seat unit being in a second row of seat units, the second row of seat units being positioned adjacent first and second seat units, the third seat unit and fourth seat unit being separated from each other by the aisle, wherein the cabin comprises an additional partition movable between a stowed position and a deployed position in which the additional partition is positioned at least partially in the aisle between the third seat unit and the fourth seat unit thereby at least partially blocking the aisle, and wherein the cabin optionally further comprises an additional item of furniture movable between a stowed position and a deployed position in which the additional item of furniture is positioned in the aisle between the third seat unit and the fourth seat unit.

9. A kit of parts for installation in an aircraft to provide the aircraft cabin of claim 1, the kit of parts comprising a plurality of seat units, a partition, and an item of furniture.

10. An aircraft comprising the aircraft cabin of claim 1.

11. The aircraft cabin according to claim 1, wherein the first seat unit comprises a first supplemental table positioned for the first seat and the second seat unit comprises a second supplemental table positioned for the second seat.

12. The aircraft cabin according to claim 1, wherein the table comprises a first table portion and a second table portion, wherein:

the first table portion is mounted to the first rear privacy wall;

the second table portion is mounted to the second rear privacy wall; and when the table is in the deployed position, the first and second table portions are positioned in the aisle laterally between the first and second seats and such that the first table portion is laterally aligned with the second table portion.

13. The aircraft cabin according to claim 1, wherein:

the first seat unit further comprises a first aisle-side privacy wall, wherein the first aisle-side privacy wall is laterally positioned between the first seat and the aisle, the first aisle-side privacy wall extending in a longitudinal direction from the first front privacy wall towards the first rear privacy wall and terminating at a location between the first front privacy wall and the first rear privacy wall to define a first space between an end of the first aisle-side privacy wall and the first rear privacy wall, wherein the first seat is longitudinally positioned between the end of the first aisle-side privacy wall and the first rear privacy wall; and the second seat unit further comprises a second aisle-side privacy wall, wherein the second aisle-side privacy wall is laterally positioned between the second seat and the aisle, the second aisle-side privacy wall extending in a longitudinal direction from the second front privacy wall towards the second rear privacy wall and terminating at a location between the second front privacy wall and the second rear privacy wall to define a second space between an end of the second aisle-side privacy wall and the second rear privacy wall, wherein the second seat is longitudinally positioned between the end of the second aisle-side privacy wall and the second rear privacy wall, wherein when the table is in the deployed position and the first and second seats are rotated to face each other, respective passengers seated in the respective first and second seats can both use the table while facing one another through the respective first and second spaces.

14. The aircraft cabin according to claim 1, wherein:

the table comprises:
- a first table portion and a second table portion, wherein the first table portion is mounted to the first rear privacy wall and the second table portion is mounted to the second rear privacy wall, wherein, when the table is in the deployed position, the first and second table portions are positioned in the aisle laterally at a location between the first and second seats and such that the first table portion is laterally aligned with the second table portion;

the first seat unit further comprises a first aisle-side privacy wall, wherein the first aisle-side privacy wall is laterally positioned between the first seat and the aisle, wherein the first aisle-side privacy wall extends in a longitudinal direction from the first front privacy wall towards the first rear privacy wall and terminates at a location between the first front privacy wall and the first rear privacy wall to define a first space between an end of the first aisle-side privacy wall and the first rear privacy wall, wherein the first seat is longitudinally positioned between the end of the first aisle-side privacy wall and the first rear privacy wall; and the second seat unit further comprises a second aisle-side privacy wall, wherein the second aisle-side privacy wall is laterally positioned between the second seat and the aisle, wherein the second aisle-side privacy wall extends in a longitudinal direction from the second front privacy wall towards the second rear privacy wall and terminates at a location between the second front privacy wall and the second rear privacy wall to provide a second space between an end of the second aisle-side privacy wall and the second rear privacy wall, wherein the second seat is longitudinally positioned between the end of the second aisle-side privacy wall and the second rear privacy wall, wherein, when the table is in the deployed position and the first and second seats are rotated to face each other, respective passengers seated in the respective first and second seats can both use the table while facing one another through the respective first and second spaces.

* * * * *